A. S. ERICKSON.
INSECT TRAP.
APPLICATION FILED FEB. 11, 1921.
1,405,822.  Patented Feb. 7, 1922.
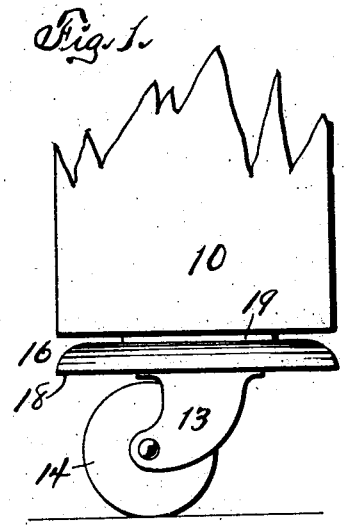
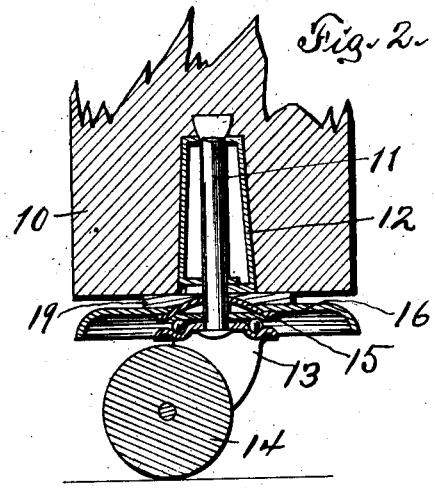
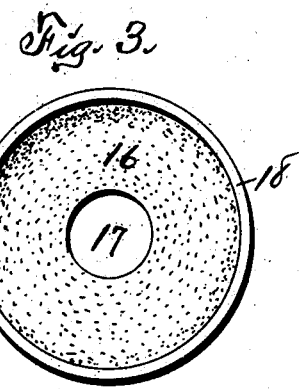
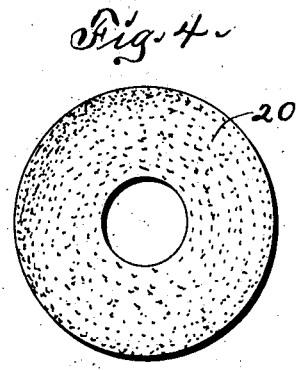
Inventor:
Alfred S. Erickson
By Silas C. Sweet
Atty

UNITED STATES PATENT OFFICE.

ALFRED S. ERICKSON, OF AMES, IOWA.

INSECT TRAP.

1,405,822.	Specification of Letters Patent.	Patented Feb. 7, 1922.

Application filed February 11, 1921. Serial No. 444,079.

*To all whom it may concern:*

Be it known that I, ALFRED S. ERICKSON, a citizen of the United States of America, and resident of Ames, Story County, Iowa, have invented a new and useful Insect Trap, of which the following is a specification.

The object of this invention is to provide means for trapping or capturing insects and preventing their travel from a floor to a furniture leg.

A further object of this invention is to provide means for replenishing the insect trap above referred to.

My invention consists in the construction, arrangement and combination of elements hereinafter set forth, pointed out in my claims and illustrated by the accompanying drawing, in which—

Figure 1 is an elevation of a furniture leg with my improved device attached thereto and Figure 2 is a vertical section of the same. Figure 3 is a bottom plan of my improved insect trap and Figure 4 is a plan of a replenishing element therefor.

Any suitable step or caster may be employed to support the furniture leg hereinafter described and the furniture leg may apply to any desired or present portion of an article of furniture, such as a sideboard, kitchen cabinet, refrigerator, food box, table or piano; and I do not desire to be understood as limited in the use of this article in respect of any object susceptible of employment therewith.

In the exemplification herein employed the numeral 10 designates a furniture leg formed with a cavity or bore opening downwardly therefrom and adapted to receive a caster stem 11 and spring casing 12 therefor. The caster stem 11 is swiveled on and rises from a fork 13 which is supported by a wheel 14, and a horn 15 is superposed relative to the fork and is carried thereon on ball bearings. A trap member 16 of circular form provided with a central hole 17, is mounted on the horn 15. The rim 18 of the trap member preferably is concaved relative to the body thereof and extends below the plane of said body, thus forming a flattened dome surrounding the horn and overhanging the caster fork and wheel. A flexible gasket 19, preferably formed of felt or rubber, may be interposed between the trap member and the furniture leg 10 to stabilize the trap member in its relation to said leg. The inner surface of the trap member 16 preferably is coated with an adhesive substance such as moist glue as shown by the stippling in Figure 3. The adhesive substance may be applied directly to the inner surface of the trap member or it may be applied to a vehicle such as a paper disk or ring 20, Figure 4, and said ring may be applied manually to the inner surface of the trap member. It is desirable to use the treated disk or ring 20 to replenish the trapping medium when the original supply thereof has deteriorated or become inoperative for any reason such as the collection of insects thereon. Such replenishing may be accomplished conveniently by removing the caster and trap member conjunctively from the furniture leg and then removing the trap member from the caster, at which time it may be cleansed and resupplied by inserting one of the treated disks or rings, after which the trap member may be replaced on the caster and the caster replaced in the furniture leg. When the parts are in the positions shown in Figures 1 and 2 insects such as ants, house flies, roaches, spiders and the like are captured by the adhesive substance when they attempt to crawl or walk over the adhesive substance in passing from the caster or fork to the furniture leg. By this means ants, worms and roaches particularly may be prevented from infesting furniture used for the support, display or storage of food and destructive insects such as spiders may be prevented from entering musical instruments such as pianos, organs and harps and interfering with the tones thereof by spinning of webs or accumulation of food in the mechanism.

I claim as my invention—

1. An insect trap, comprising a flattened dome-shaped plate and means for supporting the same beneath a furniture leg, said plate carrying on its lower surface a coating of adhesive substance adapted to capture insects traversing the same.

2. The combination of a flattened dome-shaped plate formed with a central hole and a disk formed with a central hole and adapted to be mounted within and beneath said plate, said disk having its outer lower surface coated with an adhesive substance.

Signed at Ames, in the county of Story and State of Iowa, this 2nd day of February, 1921.

ALFRED S. ERICKSON.